(12) United States Patent
Wheelwright et al.

(10) Patent No.: US 10,133,076 B2
(45) Date of Patent: Nov. 20, 2018

(54) HYBRID FRESNEL LENS WITH REDUCED ARTIFACTS

(71) Applicant: FACEBOOK TECHNOLOGIES, LLC, Menlo Park, CA (US)

(72) Inventors: Brian Wheelwright, Sammamish, WA (US); Jacques Gollier, Redmond, WA (US); Melissa Geng, Sammamish, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 15/264,496

(22) Filed: Sep. 13, 2016

(65) Prior Publication Data

US 2018/0074318 A1  Mar. 15, 2018

(51) Int. Cl.
*G02B 27/14* (2006.01)
*G02B 27/01* (2006.01)
*G02B 3/08* (2006.01)

(52) U.S. Cl.
CPC ........... *G02B 27/0172* (2013.01); *G02B 3/08* (2013.01); *G02B 27/0176* (2013.01); *G02B 2027/011* (2013.01); *G02B 2027/0152* (2013.01); *G02B 2027/0178* (2013.01)

(58) Field of Classification Search
CPC .................................................. G02B 27/0172
USPC .................................................. 359/630, 631
See application file for complete search history.

(56) References Cited

U.S. PATENT DOCUMENTS

| | | |
|---|---|---|
| 5,589,956 A | 12/1996 | Morishima et al. |
| 5,798,739 A | 8/1998 | Teitel |
| 6,452,731 B1 | 9/2002 | Schorning |
| 7,914,174 B2 | 3/2011 | Ho et al. |
| 9,681,804 B2 | 6/2017 | Spitzer |
| 2013/0107540 A1* | 5/2013 | Wu .......................... F21V 5/045 362/309 |
| 2015/0226887 A1 | 8/2015 | Gombert et al. |
| 2016/0011341 A1 | 1/2016 | Smith |
| 2016/0070104 A1* | 3/2016 | Yang .................. G02B 27/0172 349/11 |

OTHER PUBLICATIONS

Wheelwright, Office Action, U.S. Appl. No. 15/264,515, dated Jul. 13, 2017, 14 pgs.
Wheelwright, Final Office Action, U.S. Appl. No. 15/264,515, dated Jan. 12, 2018, 7 pgs.
Wheelwright, Notice of Allowance U.S. Appl. No. 15/264,515, dated Mar. 21, 2018, 8 pgs.

(Continued)

*Primary Examiner* — James Jones
(74) *Attorney, Agent, or Firm* — Morgan, Lewis & Bockius LLP (57) ABSTRACT

A lens defined by a first lens surface and a second lens surface opposite to the first lens surface is disclosed. A first portion of the first lens surface is defined by a smooth surface profile function, and a second portion of the first lens surface is defined by a Fresnel surface profile function. The second portion of the first lens surface is around the first portion of the first lens surface. Also disclosed is a display device that includes the lens and an array of light emitting devices coupled with the lens for outputting light through the lens.

19 Claims, 10 Drawing Sheets

(56) References Cited

OTHER PUBLICATIONS

Wheelwright, Office Action, U.S. Appl. No. 15/594,426, dated Jul. 27, 2017, 16 pgs.
Wheelwright, Final Office Action, U.S. Appl. No. 15/594,426, dated Feb. 2, 2018, 14 pgs.
Wheelwright, Office Action, U.S. Appl. No. 15/594,467, dated Jul. 28, 2017, 14 pgs.
Wheelwright, Final Office Action, U.S. Appl. No. 15/594,467, dated Feb. 1, 2018, 16 pgs.
Wheelwright, Office Action, U.S. Appl. No. 15/594,485, dated Jul. 28, 2017, 18 pgs.
Wheelwright, Final Office Action, U.S. Appl. No. 15/594,485, dated Feb. 1, 2018, 17 pgs.

* cited by examiner

Figure 4A slope-continuous substrate, Fresnel Slope = 0

Figure 4B slope-discontinuous substrate, Fresnel Slope = 0

Figure 4C slope-discontinuous substrate, Fresnel Slope ≠ 0

Figure 4D slope-continuous substrate, Fresnel Slope ≠ 0

HYBRID FRESNEL LENS WITH REDUCED ARTIFACTS

RELATED APPLICATIONS

This application is related to U.S. patent application Ser. No. 15/264,502, entitled "Hybrid Fresnel Lens with Increased Field of View," filed Sep. 13, 2016 and U.S. patent application Ser. No. 15/264,515, entitled "Dynamic Draft for Fresnel Lenses," filed Sep. 13, 2016, both of which are incorporated by reference herein in their entireties.

TECHNICAL FIELD

This relates generally to optical lenses, and more specifically to optical lenses used in head-mounted display devices.

BACKGROUND

Head-mounted display devices (also called herein head-mounted displays) are gaining popularity as means for providing visual information to user. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience.

Fresnel lenses provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions associated with Fresnel structures, and thus, their use in imaging applications is limited.

Thus, there is a need for lenses that are compact and light while maintaining the quality of projected images.

The above deficiencies and other problems associated with conventional lenses are reduced or eliminated by the disclosed lens. In some embodiments, the lens is included in a display device. In some embodiments, the device is a head-mounted display device. In some embodiments, the device is portable.

In accordance with some embodiments, a lens is defined by a first lens surface and a second lens surface opposite to the first lens surface. A first portion of the first lens surface is defined by a smooth surface profile function, and a second portion of the first lens surface is defined by a Fresnel surface profile function. The second portion of the first lens surface is around the first portion of the first lens surface.

In accordance with some embodiments, a display device includes a lens described herein and an array of light emitting devices coupled with the lens for outputting light through the lens.

Thus, the disclosed embodiments provide compact and light weight display devices with increased efficiency, effectiveness, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

Conventional head-mounted displays are larger and heavier than typical eyeglasses, because conventional head-mounted displays often include a complex set of optics that can be bulky and heavy. It is not easy for users to get used to wearing such large and heavy head-mounted displays.

Fresnel lenses, having multiple concentric annular sections that are offset from one another (e.g., for a circular lens), provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions and other stray light artifacts associated with Fresnel structures, and thus, their use in imaging applications is limited.

The disclosed embodiments provide lenses, with hybrid surface profiles, that are compact and light, and cause reduced diffraction.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first surface could be termed a second surface, and, similarly, a second surface could be termed a first surface, without departing from the scope of the various described embodiments. The first surface and the second surface are both surfaces, but they are not the same surfaces.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
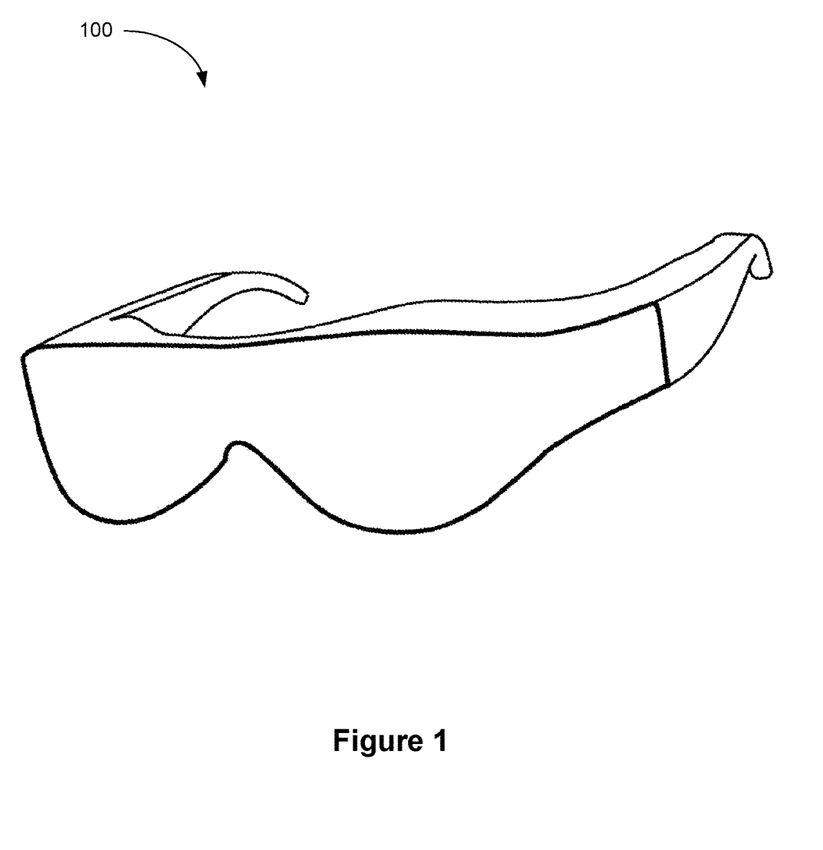
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
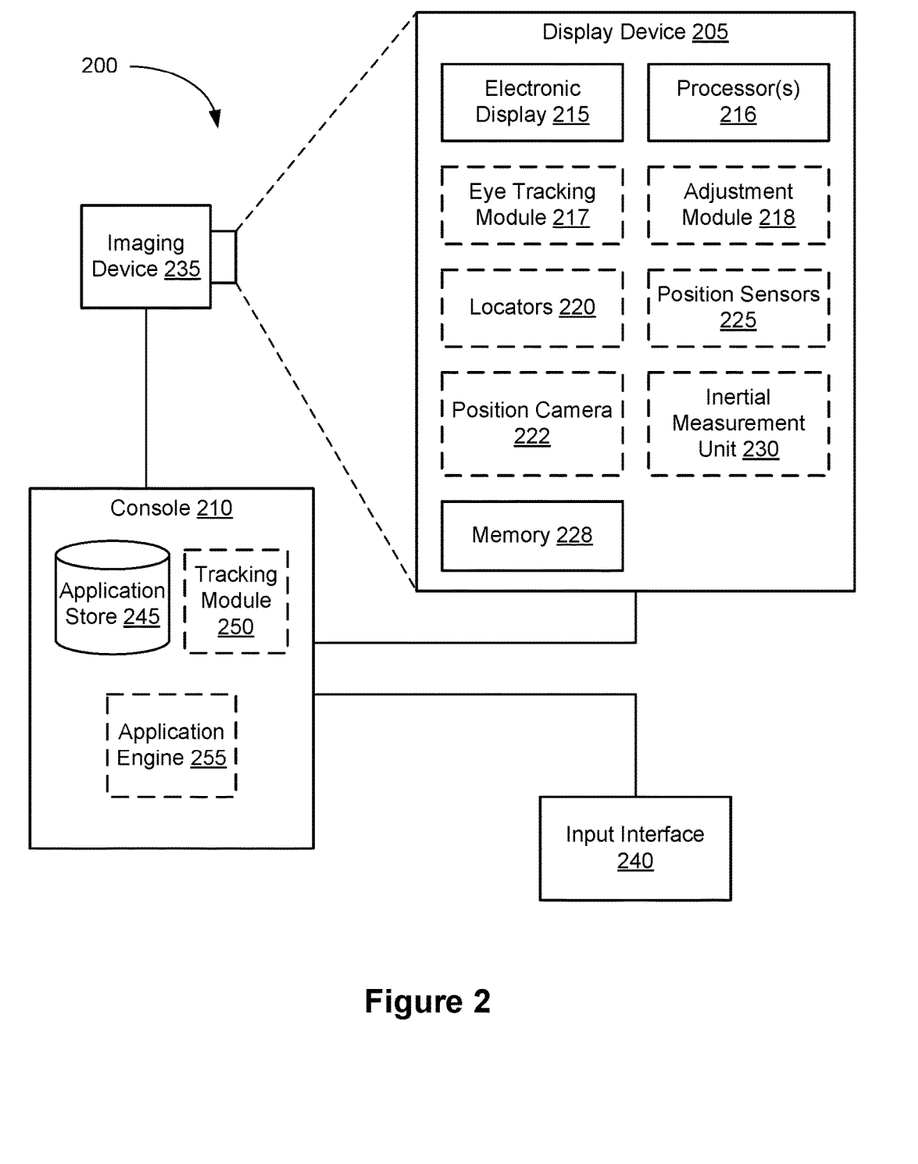
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
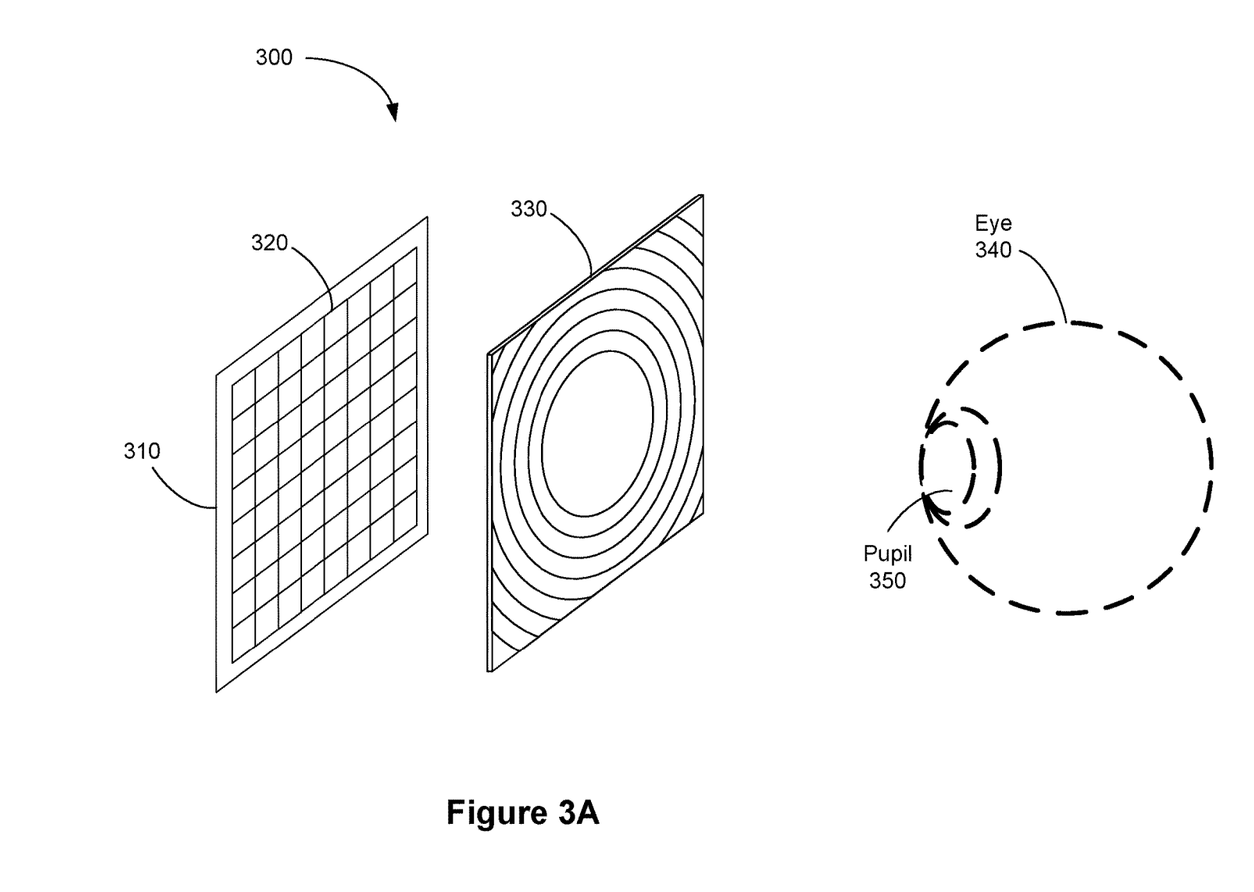
FIG. 3A is an isometric view of a display device in accordance with some embodiments.

FIG. 3A is an isometric view of display device 300 in accordance with some embodiments. In some other embodiments, display device 300 is part of some other electronic display (e.g., digital microscope, etc.). In some embodiments, display device 300 includes light emission device array 310 and one or more lenses (e.g., lens 330). In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses (e.g., lens 330). In some embodiments, display device 300 uses the emission intensity array to facilitate providing image light to a location of pupil 350 of eye 340 of a user, and minimize the amount of image light provided to other areas in the eyebox.

One or more lenses (e.g., lens 330) receive the modified image light (e.g., attenuated light) from the emission intensity array (or directly from emission device array 310), and directs the modified image light to a location of pupil 350. In some embodiments, lens 330 includes one or more diffractive optics. In some embodiments, the one or more lenses include active lens. An active lens is a lens whose lens curvature and/or refractive ability may be dynamically controlled (e.g., via a change in applied voltage). An active lens may be a liquid crystal lens, a liquid lens (e.g., using electro-wetting), or some other lens whose curvature and/or refractive ability may be dynamically controlled, or some combination thereof. Accordingly, in some embodiments, system 200 may dynamically adjust the curvature and/or refractive ability of active lenslets to direct light received from the emission device array 310 to pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses (e.g., lens 330) toward the determined location of pupil 350, and not toward other locations in the eyebox.

Figure 3B:
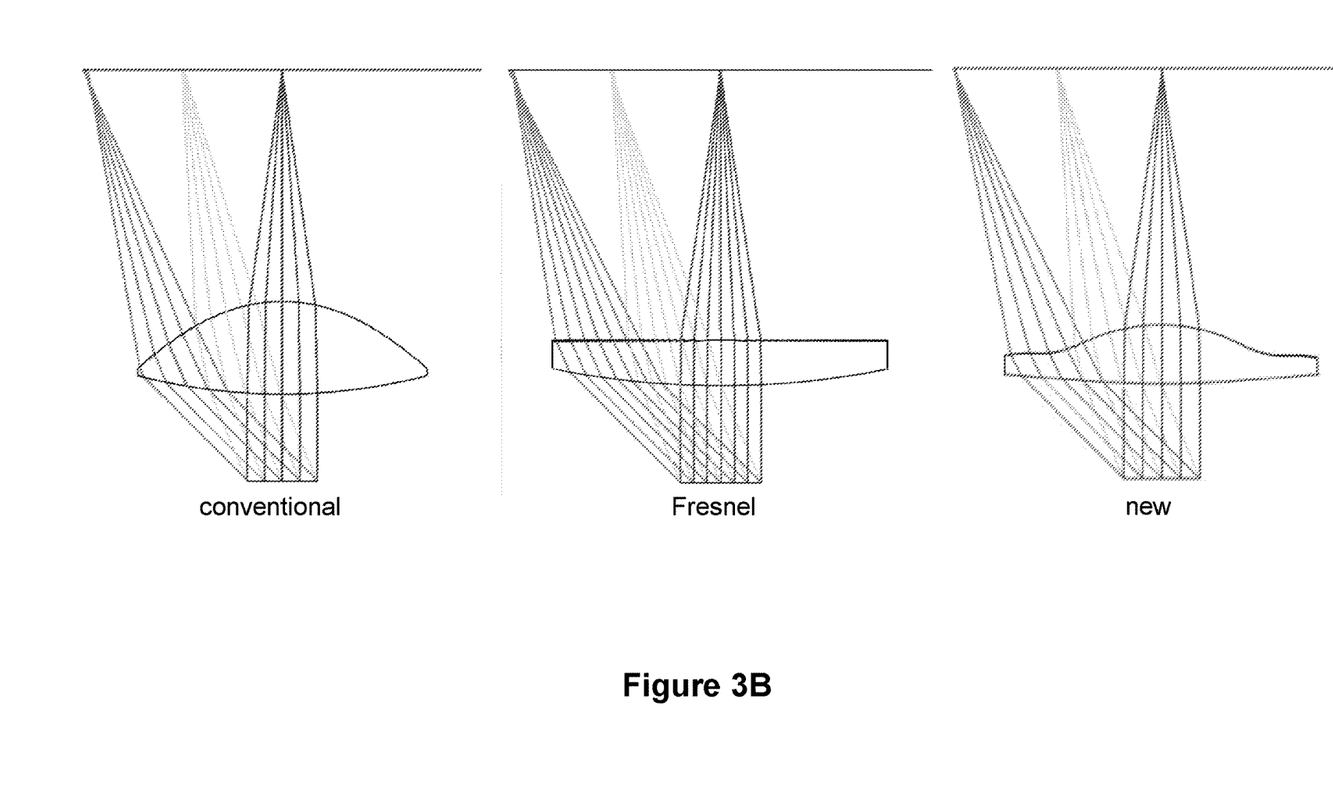
FIG. 3B shows cross-sectional views of a conventional lens, a Fresnel lens, and a new lens design in accordance with some embodiments.

FIG. 3B shows cross-sectional views of a conventional lens, a Fresnel lens, and a new lens design in accordance with some embodiments.

The conventional lens shown in FIG. 3B is a convex-convex lens configured to focus light from a light emission device array. To obtain a short focal length, the conventional lens has a surface profile with a short radius of curvature. As a result, the center of the conventional lens is thick.

The Fresnel lens shown in FIG. 3B has an aperture and a focal length comparable to those of the conventional lens shown in FIG. 3B. The Fresnel lens shown in FIG. 3B is thinner than the conventional lens shown in FIG. 3B. As a result, the Fresnel lens shown in FIG. 3B is lighter than the conventional lens shown in FIG. 3B. However, the Fresnel lens shown in FIG. 3B suffers from diffractions associated with Fresnel structures, and thus, the use of the Fresnel lens in imaging applications is limited.

The new lens shown in FIG. 3B utilizes a conventional lens surface and a Fresnel lens surface. The new lens shown in FIG. 3B has an aperture and a focal length comparable to those of the conventional lens shown in FIG. 3B. The new lens shown in FIG. 3B is thinner than the conventional lens shown in FIG. 3B, and as a result, the new lens shown in FIG. 3B is light than the conventional lens shown in FIG. 3B. In addition, a center region of the new lens has a smooth surface profile (as opposed to a Fresnel surface profile), and thus, diffractions associated with Fresnel structures are reduced and/or eliminated.

Figure 3C:
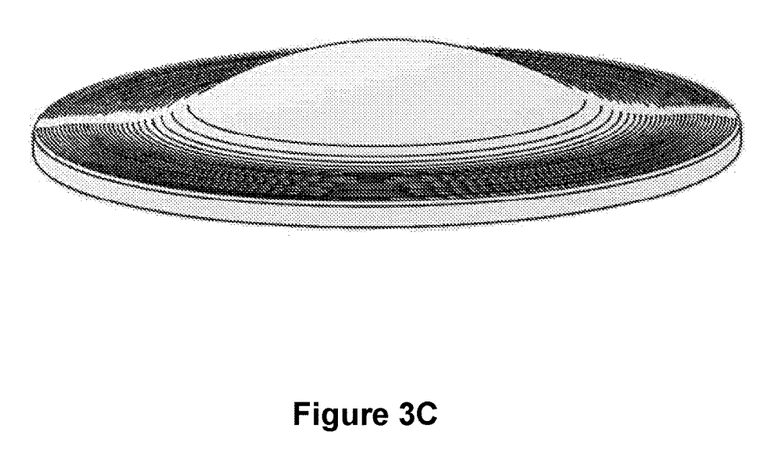
FIG. 3C shows an isometric view of a lens in accordance with some embodiments.

FIG. 3C shows an isometric view of a lens in accordance with some embodiments. The lens shown in FIG. 3C is axisymmetric (e.g., rotationally symmetric about a center of the lens). Although the lens shown in FIG. 3C is a circular lens, in some embodiments, a portion of the circular lens is cut out (e.g., a rectangular portion of the lens, as shown in FIG. 3A, is used).

Figure 3D:
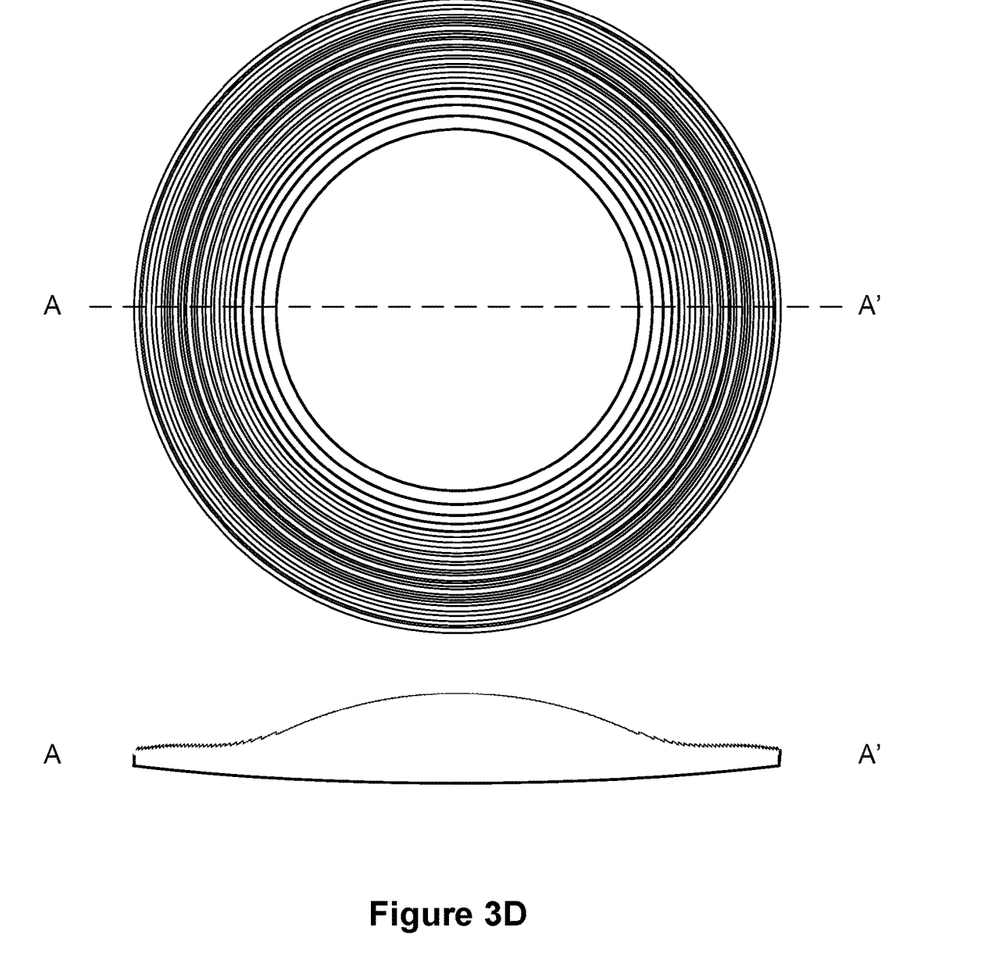
FIG. 3D shows a plan view and a cross-sectional view of the lens shown in FIG. 3C.

FIG. 3D shows a plan view and a cross-sectional view of the lens shown in FIG. 3C. Line AA' on the plan view represents a plane upon which the cross-sectional view is taken. The cross-sectional view of the lens is illustrated in detail in FIG. 3E.

Figure 3E:
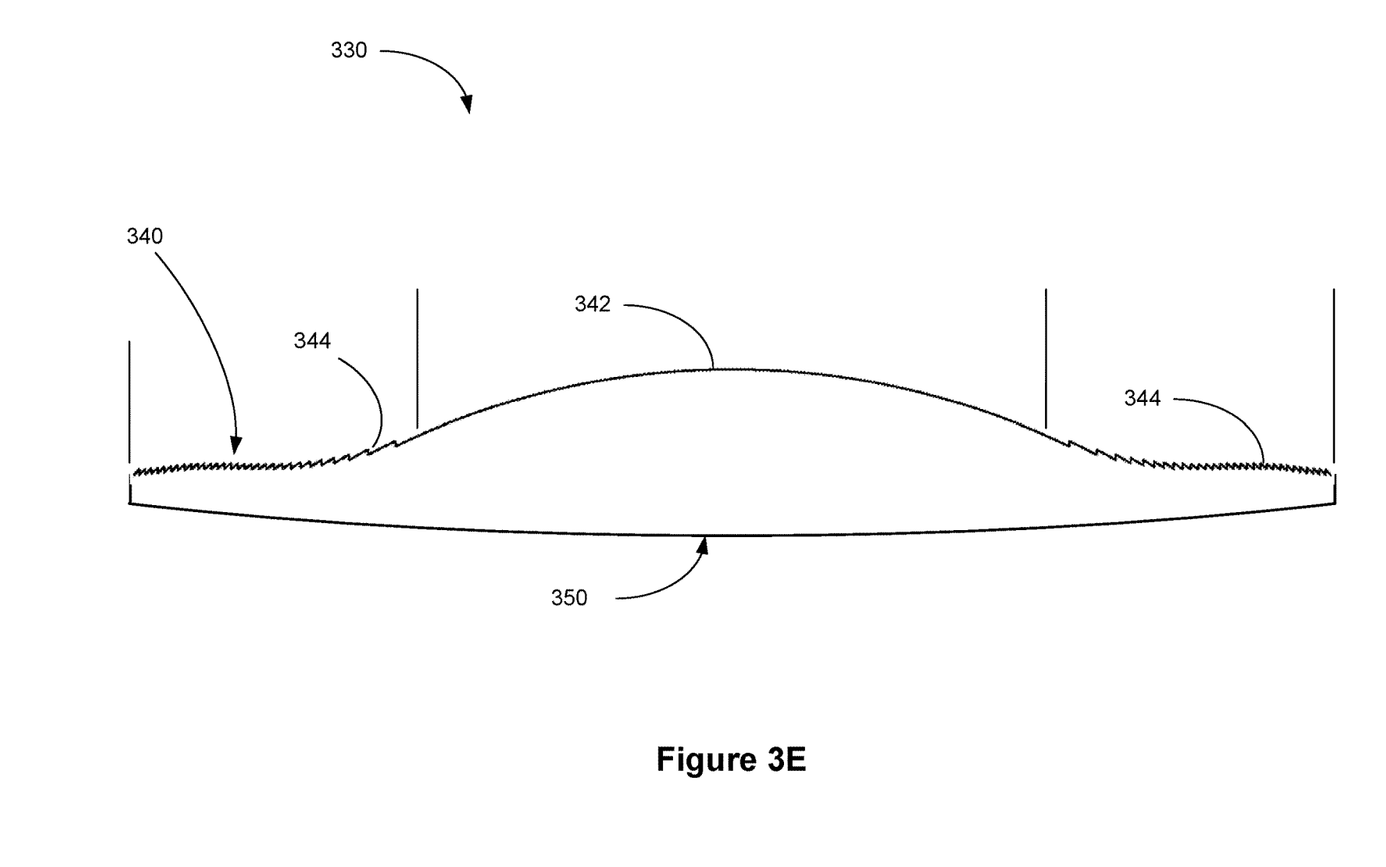
FIG. 3E shows a cross-sectional view of the lens shown in FIG. 3C.

FIG. 3E shows a cross-sectional view of the lens shown in FIG. 3C.

The lens is defined by first lens surface 340 and second lens surface 350 opposite to the first lens surface. First portion 342 of first lens surface 340 is defined by a smooth surface profile function. Second portion 344 of first lens surface 340 is defined by a Fresnel surface profile function. Second portion 344 of first lens surface 340 is around first portion 342 of first lens surface 340 (e.g., second portion 344 of first lens surface 340 corresponds to concentric annular sections, of the lens, that are offset from one another).

In some embodiments, a width (e.g., a diameter) of first portion 342 of first lens surface 340 is at least 10% of a width (e.g., a diameter) of the lens. In some embodiments, the width (e.g., the diameter) of first portion 342 of first lens surface 340 is at least 20% of the width (e.g., the diameter) of the lens. In some embodiments, the width (e.g., the diameter) of first portion 342 of first lens surface 340 is at least 30% of the width (e.g., the diameter) of the lens. In some embodiments, the width (e.g., the diameter) of first portion 342 of first lens surface 340 is at least 40% of the width (e.g., the diameter) of the lens. In some embodiments, the width (e.g., the diameter) of first portion 342 of first lens surface 340 is at least 50% of the width (e.g., the diameter) of the lens. In some embodiments, the width (e.g., the diameter) of first portion 342 of first lens surface 340 is at least 60% of the width (e.g., the diameter) of the lens. In some embodiments, the width (e.g., the diameter) of first portion 342 of first lens surface 340 is at least 70% of the width (e.g., the diameter) of the lens. In some embodiments, the width (e.g., the diameter) of first portion 342 of first lens surface 340 is at least 80% of the width (e.g., the diameter) of the lens.

As used herein, a smooth surface profile function refers to a surface profile function whose derivative is continuous (e.g., when a surface profile is defined as a function of a radial position a, such as F(a), the derivative of F(a), such as F'(a), is continuous). In some embodiments, a Fresnel surface profile function is characterized by discontinuities in a derivative of the Fresnel surface profile function (e.g., when a surface profile is defined as a function of a radial position a, such as F(a), the derivative of F(a), such as F'(a), has discontinuities). In some embodiments, a smooth surface profile function is characterized by a derivative of the smooth surface profile function having zero and either positive or negative values from a center of the lens to one end of the lens (e.g., the derivative of the smooth surface profile function has zero and negative values only from the center of the lens to one end of the lens), and a Fresnel surface profile function is characterized by a derivative of the Fresnel surface profile function having both positive and negative values from the center of the lens to one end of the lens.

In some embodiments, the Fresnel surface profile function defines grooves of a same height. In some embodiments, the Fresnel surface profile function defines grooves of a same width.

In some embodiments, a height of first portion 342 (e.g., a difference between a center thickness of lens 330 and a thickness of lens 330 at a junction between first portion 342 and second portion 344) is greater than any groove height (e.g., a vertical distance, parallel to an axis of lens 330, between a peak and a valley of a groove defined in second portion 344). In some embodiments, the height of first portion 342 is at least twice any groove height. In some embodiments, the height of first portion 342 is at least three times any groove height. In some embodiments, the height of first portion 342 is at least five times any groove height. In some embodiments, the height of first portion 342 is at least ten times any groove height.

Figure 3F:
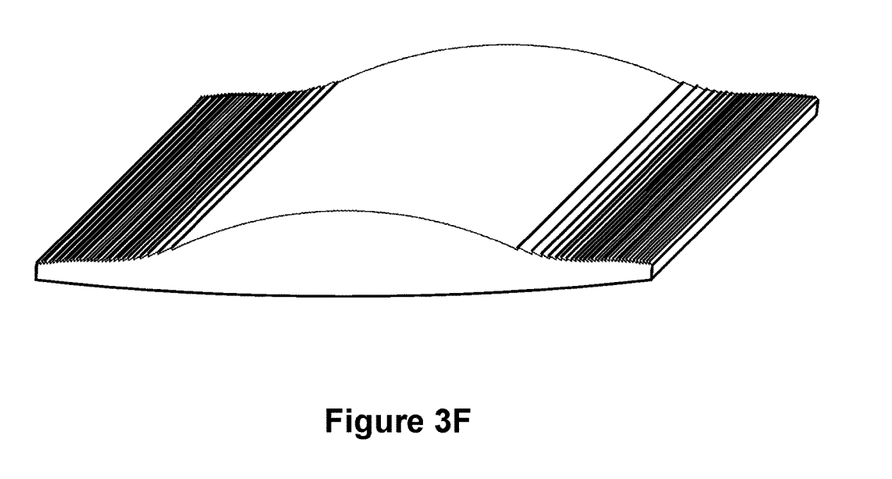
FIG. 3F shows an isometric view of a cylindrical lens in accordance with some embodiments.

FIG. 3F shows an isometric view of a cylindrical lens in accordance with some embodiments. The lens in FIG. 3F has a cross-section that corresponds to the cross-section shown in FIG. 3E in only one direction.

The lens in FIG. 3F focuses light along a first direction, but does not focus light along a second direction that is perpendicular to the first direction. Thus, the lens in FIG. 3E performs like a cylindrical lens.

Figure 4A:
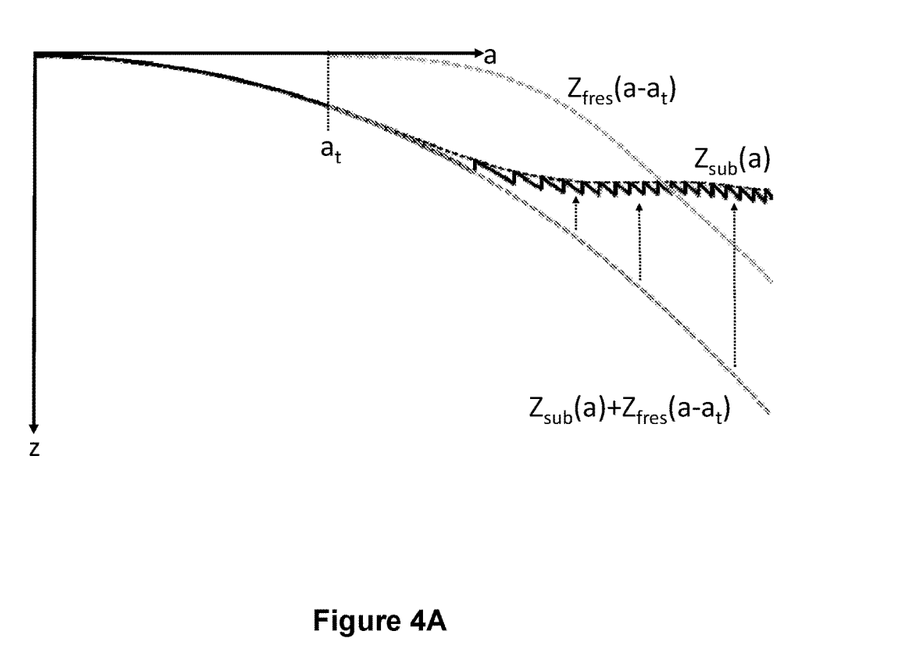
FIG. 4A illustrates a superposition of two surface profiles in accordance with some embodiments.

FIG. 4A illustrates a superposition of two surface profiles in accordance with some embodiments.

A surface profile (e.g., the first lens surface) of the cross-section of the lens shown in FIG. 3C can be represented as a superposition (or a sum) of two surface profile functions. The first function, $Z_{sub}$ represents a surface profile function of a lens with a smooth surface (also called herein a substrate surface profile). $Z_{fres}$ represents a surface profile function of a lens with Fresnel structures (also called herein a parent surface profile). In FIG. 4A, Fresnel structures (e.g., periodic structures) are not shown with $Z_{fres}$ for brevity. However, a person skilled in the art would understand that $Z_{fres}$ would include the periodic structures shown with respect to a sum of $Z_{sub}$ and $Z_{fres}$.

As shown in FIG. 4A, $Z_{fres}$ defines Fresnel structures for a portion of the lens where the radial position a is greater than a transition point $a_t$. A center portion of the lens does not have Fresnel structures. Thus, diffractions associated with Fresnel structures are reduced or eliminated. A peripheral portion (e.g., $a > a_t$) of the lens has Fresnel structures, which provides additional diffraction. This allows reduction of the thickness of the lens.

In some embodiments, $Z_{fres}$ flat (e.g., $Z_{fres}(a)=0$) when the radial is position a is less than the transition point $a_t$. In some embodiments, $Z_{fres}$ corresponds to a Fresnel surface profile and a shifted $Z_{fres}$ (e.g., $Z_{fres}$ shifted by $a_t$, such as $Z_{fres}(a-a_t)$) is used for determining the superposition of the two surface profile functions. In some embodiments, $Z_{fres}(a)$ is zero when the radial position a is less than the transition point $a_t$.

Figure 4B:
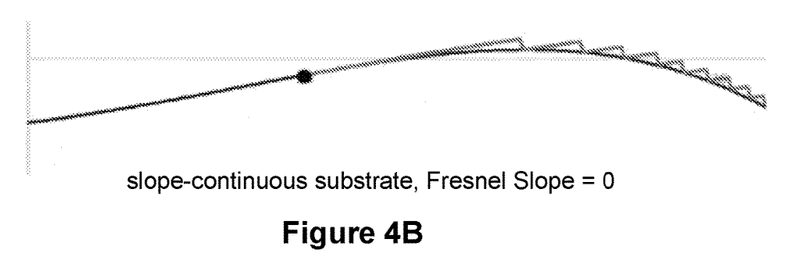
FIG. 4B illustrates an exemplary surface profile in accordance with some embodiments.

FIG. 4B illustrates an exemplary surface profile in accordance with some embodiments.

In FIG. 4B, the smooth lens surface transitions into the Fresnel lens surface in a way so that the smooth lens surface and the Fresnel lens surface are continuous and their slopes also match at a junction of the smooth lens surface and the Fresnel lens surface. It has been found that when the slope of the smooth lens surface and the slope of the Fresnel lens surface match at the junction, the transition becomes optically seamless. This reduces or eliminates artifacts at the transition. Those skilled in the art will recognize that maintaining higher-order continuities (e.g. to $2^{nd}$ and $3^{rd}$ order) further reduces artifacts (e.g. ripples in the distortion) at the transition. Thus, in some embodiments, a second derivative of the smooth lens surface and a second derivative of the Fresnel lens surface match at the junction. In some embodiments, a third derivative of the smooth lens surface and a third derivative of the Fresnel lens surface match at the junction.

Figure 4C:
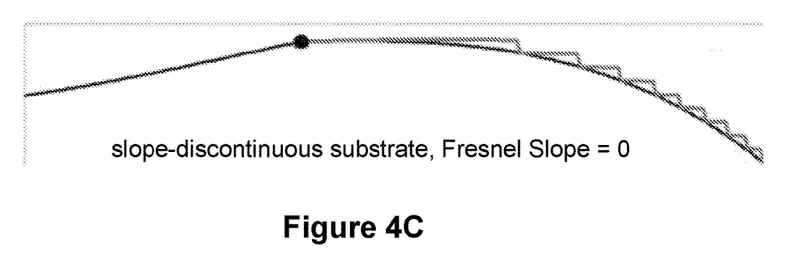
FIG. 4C illustrates an exemplary surface profile in accordance with some embodiments.
Figure 4D:
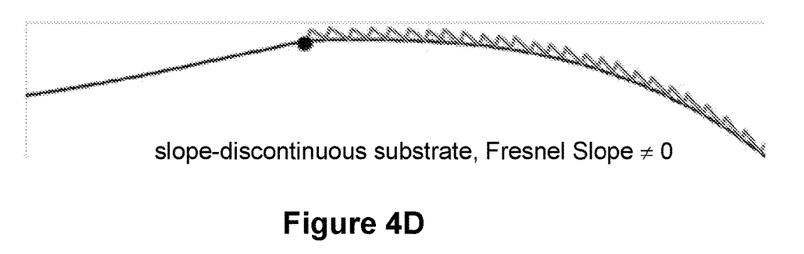
FIG. 4D illustrates an exemplary surface profile in accordance with some embodiments.
Figure 4E:
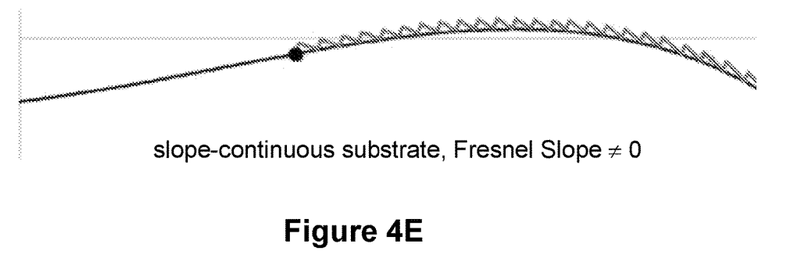
FIG. 4E illustrates an exemplary surface profile in accordance with some embodiments.

FIGS. 4C-4E illustrate exemplary surface profiles in accordance with some embodiments. In FIGS. 4C-4E, the smooth lens surface transitions into the Fresnel lens surface in a way so that the smooth lens surface and the Fresnel lens surface are continuous but their slopes do not match at the junction of the smooth lens surface and the Fresnel lens surface. In these lenses, the abrupt change in the slope causes an imaging artifact. Ray bundles that straddle this discontinuity split to different portions of the display, which increases the visibility of the transition.

In light of these principles, we now turn to certain embodiments.

In accordance with some embodiments, a lens is defined by a first lens surface and a second lens surface opposite to the first lens surface (e.g., in FIG. 3C, lens 330 is defined by first lens surface 340 and second lens surface 350). The first lens surface and the second lens surface are optical lens surfaces (e.g., configured to transmit light). A first portion (e.g., portion 342) of the first lens surface is defined by a smooth surface profile function, and a second portion (e.g., portion 344) of the first lens surface is defined by a Fresnel surface profile function. The second portion of the first lens surface is around the first portion of the first lens surface (e.g., in FIG. 3D, the portion with the Fresnel features surrounds the portion without Fresnel features; and in FIG. 3E, the portion without Fresnel features is located between the portions with the Fresnel features).

In some embodiments, a width (e.g., a diameter) of the first portion of the first lens surface is at least 10% of a width (e.g., a diameter) of the lens.

In some embodiments, the first portion and the second portion of the first lens surface are defined by a sum of two surface profile functions. In FIG. 4A, the first lens surface is defined by a sum of surface profile functions $Z_{sub}$ and $Z_{fres}$. A first surface profile function (e.g., $Z_{sub}$ in FIG. 4A) of the two surface profile functions defines a smooth surface profile across the first portion and the second portion of the first lens surface. A second surface profile function (e.g., $Z_{fres}$ in FIG. 4A) of the two surface profile functions defines: a smooth surface profile across a first portion of the first lens surface (e.g., for a region where $a<a_t$); and a Fresnel surface profile (e.g., a surface profile used to generate a Fresnel surface) across a second portion of the first lens surface (e.g., for a region where $a>a_t$).

In some embodiments, a derivative (e.g., a first derivative) of the first surface profile function is continuous across the first portion and the second portion of the first lens surface, and a derivative (e.g., a first derivative) of the second surface profile function is continuous across the first portion of the first lens surface.

In some embodiments, a second derivative of the first surface profile function is continuous across the first portion and the second portion of the first lens surface, and a second derivative of the second surface profile function is continuous across the first portion of the first lens surface.

In some embodiments, a derivative (e.g., a first derivative) of the sum of the two surface profile functions is continuous across the first portion and the second portion of the first lens surface. In some embodiments, a second derivative of the sum of the two surface profile functions is continuous across the first portion and the second portion of the first lens surface.

In some embodiments, the smooth surface profile, of the second surface profile function, across the first portion of the first lens surface is flat (e.g., in FIG. 4A, $Z_{fres}$ is flat across the region where $a<a_t$).

In some embodiments, as explained above with respect to FIG. 4A, the second surface profile function corresponds to a Fresnel surface profile function that is shifted (e.g., by $a_t$) so that the Fresnel surface profile starts from $a=a_t$.

In some embodiments, a derivative of the second surface profile function has discontinuities across the second portion of the first lens surface (e.g., the second portion has Fresnel structures).

In some embodiments, the lens is configured to focus light impinging on the first lens surface. For example, the lens operates as a focusing lens. In some embodiments, the lens is configured to disperse light impinging on the first lens surface. For example, the lens operates as a dispersing lens.

In some embodiments, the second sub-portion includes an annular region, around the first portion, of the first lens surface (e.g., see FIG. 3D).

In some embodiments, the first portion of the portion of the first lens surface is a single contiguous region of the first lens surface (e.g., a center portion of the lens shown in FIG. 3D); and the second portion of the portion of the first lens surface is a single contiguous region of the first lens surface (e.g., a peripheral portion of the lens shown in FIG. 3D).

In some embodiments, the second portion of the first lens surface extends from the first portion of the first lens surface (e.g., the second portion of the first lens surface and the first portion of the first lens surface are continuous).

In some embodiments, the smooth surface profile of the second surface profile has a first slope adjacent to a junction between the first portion of the first lens surface and the second portion of the first lens surface; the Fresnel surface profile of the second surface profile has a second slope adjacent to the junction between the first portion of the first lens surface and the second portion of the first lens surface; and the first slope is substantially the same as the second slope (e.g., the first slope and the second slope differs by less than 15 degrees, 10 degrees, 9 degrees, 8 degrees, 7 degrees, 6 degrees, 5 degrees, 4 degrees, 3 degrees, 2 degrees, or 1 degree). In some embodiments, the first slope and the second slope are the same.

In some embodiments, a derivative of the second surface profile function adjacent to a junction between the first portion of the first lens surface and the second portion of the first lens surface is zero. This facilitates the first slope and the second slope to match, thereby reducing or eliminating artifacts caused by the lens.

In some embodiments, the first portion and the second portion of the first lens surface are rotationally symmetric (e.g., see FIG. 3D).

In some embodiments, the first portion and the second portion of the first lens surface are reflectionally symmetric without being rotationally symmetric (e.g., see FIG. 3F).

In some embodiments, the smooth surface profile defined by the first surface profile function corresponds to a spherical curve (e.g., a portion of the lens surface is a spherical lens surface).

In some embodiments, the smooth surface profile defined by the first surface profile function corresponds to an aspheric curve (e.g., a portion of the lens surface is an aspheric lens surface, such as a paraboloidal surface).

In some embodiments, the second surface is a flat surface. In some embodiments, the second surface is a spherical lens surface. In some embodiments, the second lens surface is an aspherical lens surface (e.g., a paraboloidal lens surface).

In accordance with some embodiments, a display device (e.g., display device 300 in FIG. 3A) includes the lens discussed above (e.g., lens 330 in FIG. 3A). The display device also includes an array of light emitting devices (e.g., an array of light emitting devices 310 in FIG. 3A) coupled with the lens for outputting light through the lens.

In some embodiments, the display device is a head-mounted display device.

In some embodiments, the array of light emitting devices is configured to output light and transmit the light through the lens toward an eye of a user when the display device is worn on a head of the user.

In accordance with some embodiments, a lens is defined by a first lens surface and a second lens surface opposite to the first lens surface. A first portion of the first lens surface has a smooth surface profile, and a second portion of the first lens surface has Fresnel features. The second portion of the first lens surface is around the first portion of the first lens surface. In some embodiments, the second portion includes a plurality of concentric annular sections, that are offset from one another, around the first portion.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
 a lens, defined by a first lens surface and a second lens surface opposite to the first lens surface, wherein:
  a first portion of the first lens surface is defined by a smooth surface profile function;
  a second portion of the first lens surface is defined by a Fresnel surface profile function;
  the second portion of the first lens surface is around the first portion of the first lens surface;
  the first portion and the second portion of the first lens surface are defined by a sum of two surface profile functions;
  a first surface profile function of the two surface profile functions defines a smooth surface profile across the first portion and the second portion of the first lens surface;
  the smooth surface profile defined by the first surface profile function corresponds to an aspheric curve; and
  a second surface profile function of the two surface profile functions defines:
   a smooth surface profile across the first portion of the first lens surface; and
   a Fresnel surface profile across the second portion of the first lens surface; and
 an array of light emitting devices coupled with the lens for outputting light through the lens.

2. The display device of claim 1, wherein the array of light emitting devices is configured to output light and transmit the light through the lens toward an eye of a user when the display device is worn on a head of the user.

3. The display device of claim 1, wherein the first lens surface of the lens is positioned toward the array of light emitting devices and the second lens surface of the lens is positioned away from the array of light emitting devices.

4. The display device of claim 1, wherein the display device is a head-mounted display device.

5. A lens, defined by a first lens surface and a second lens surface opposite to the first lens surface, wherein:
 a first portion of the first lens surface is defined by a smooth surface profile function;
 a second portion of the first lens surface is defined by a Fresnel surface profile function;
 the first portion and the second portion of the first lens surface are defined by a sum of two surface profile functions;
 a first surface profile function of the two surface profile functions defines a smooth surface profile across the first portion and the second portion of the first lens surface;
 the smooth surface profile defined by the first surface profile function corresponds to an aspheric curve; and
 a second surface profile function of the two surface profile functions defines:
  a smooth surface profile across the first portion of the first lens surface; and
  a Fresnel surface profile across the second portion of the first lens surface.

6. The lens of claim 5 wherein:
 a width of the first portion of the first lens surface is at least 10% of a width of the lens.

7. The display device lens of claim 5 wherein:
 a derivative of the first surface profile function is continuous across of the first portion and the second portion of the first lens surface; and
 a derivative of the second surface profile function is continuous across the first portion of the first lens surface.

8. The lens of claim 5 wherein:
 the smooth surface profile, of the second surface profile function, across the first portion of the first lens surface is flat.

9. The lens of claim 5 wherein:
 a derivative of the second surface profile function has discontinuities across the second portion of the first lens surface.

10. The lens of claim 5 wherein:
 the lens is configured to focus light impinging on the first lens surface.

11. The lens of claim 5 wherein:
 the second portion includes an annular region, around the first portion, of the first lens surface.

12. The lens of claim 5 wherein:
 the first portion of the first lens surface is a single contiguous region of the first lens surface; and
 the second portion of the first lens surface is a single contiguous region of the first lens surface.

13. The lens of claim 5 wherein:
 the second portion of the first lens surface extends from the first portion of the first lens surface.

14. The lens of claim 13, wherein:
 a derivative of the second surface profile function adjacent to a junction between the first portion of the first lens surface and the second portion of the first lens surface is zero.

15. The lens of claim 5 wherein:
 the first portion and the second portion of the first lens surface are rotationally symmetric.

16. The lens of claim 5 wherein:
 the first portion and the second portion of the first lens surface are reflectionally symmetric without being rotationally symmetric.

17. The lens of claim 5 wherein:
 the smooth surface profile defined by the first surface profile function corresponds to a spherical curve.

18. The lens of claim 5 wherein:
 the second surface is a flat surface.

19. The lens of claim 5, wherein the second portion of the first lens surface is around the first portion of the first lens surface.

* * * * *

UNITED STATES PATENT AND TRADEMARK OFFICE
CERTIFICATE OF CORRECTION

PATENT NO. : 10,133,076 B2
APPLICATION NO. : 15/264496
DATED : November 20, 2018
INVENTOR(S) : Wheelwright et al.

Page 1 of 1

It is certified that error appears in the above-identified patent and that said Letters Patent is hereby corrected as shown below:

In the Claims

Claim 7, Column 16, Line 6, please delete "display device";

Claim 7, Column 16, Line 8, please delete "across of the" and insert --across the--.

Signed and Sealed this
Nineteenth Day of February, 2019

Andrei Iancu
*Director of the United States Patent and Trademark Office*